(12) United States Patent
Filtenborg et al.

(10) Patent No.: US 12,211,276 B2
(45) Date of Patent: Jan. 28, 2025

(54) LINGUALLY CONSTRAINED TRACKING OF VISUAL OBJECTS

(71) Applicant: QUALCOMM Technologies, Inc., San Diego, CA (US)

(72) Inventors: Christen Maximilian Filtenborg, Diemen (NL); Deepak Kumar Gupta, Amsterdam (NL)

(73) Assignee: QUALCOMM Technologies, Inc., San Diego, CA (US)

(*) Notice: Subject to any disclaimer, the term of this patent is extended or adjusted under 35 U.S.C. 154(b) by 532 days.

(21) Appl. No.: 17/526,969

(22) Filed: Nov. 15, 2021

(65) Prior Publication Data

US 2022/0156502 A1    May 19, 2022

Related U.S. Application Data

(60) Provisional application No. 63/114,356, filed on Nov. 16, 2020.

(51) Int. Cl.
*G06V 20/40* (2022.01)
*G06F 40/30* (2020.01)
*G06N 3/04* (2023.01)
*G06V 10/44* (2022.01)
*G06V 10/94* (2022.01)

(52) U.S. Cl.
CPC .............. *G06V 20/46* (2022.01); *G06F 40/30* (2020.01); *G06V 10/449* (2022.01); *G06V 10/95* (2022.01); *G06N 3/04* (2013.01)

(58) Field of Classification Search
CPC .... G06V 20/46; G06V 10/454; G06V 10/806; G06V 20/44; G06V 30/10; G06V 2201/07; G06V 10/449; G06V 10/95; G06F 40/30; G06N 3/04
See application file for complete search history.

(56) References Cited

U.S. PATENT DOCUMENTS

| | | | |
|---|---|---|---|
| 2018/0129742 A1* | 5/2018 | Li | G06N 3/044 |
| 2019/0147284 A1* | 5/2019 | Gavrilyuk | G06T 7/73 382/103 |
| 2020/0304822 A1* | 9/2020 | Wang | G06V 20/41 |
| 2021/0004534 A1* | 1/2021 | Mizushima | G06N 3/045 |

(Continued)

FOREIGN PATENT DOCUMENTS

WO    2018089158 A1    5/2018

OTHER PUBLICATIONS

Wu et al. ("Motion Guided Siamese Trackers for Visual Tracking", published Jan. 6, 2020). (Year: 2020).*

(Continued)

*Primary Examiner* — Dung Hong
(74) *Attorney, Agent, or Firm* — QUALCOMM Technologies, Inc.

(57) ABSTRACT

A computer-implemented method for tracking with visual object constraints includes receiving a lingual constraint and a video. A word embedding is generated based on the lingual constraint. A set of features is extracted for one or more frames of the video. The word embedding is cross-correlated to the set of features for the one or more frames of the video. A prediction indicating whether the lingual constraint is in the one or more frames of the video is generated based on the cross-correlation.

28 Claims, 9 Drawing Sheets

(56) References Cited

U.S. PATENT DOCUMENTS

2021/0224601 A1* 7/2021 Chen .................. G06N 3/08

OTHER PUBLICATIONS

Vaswani et al., "Attention Is All You Need", 2017 (Year: 2017).*

Li B., et al., "SiamRPN++: Evolution of Siamese Visual Tracking with Very Deep Networks", Submitted date Dec. 31, 2018, pp. 4282-4291.

Yu Z., et al., "Deep Modular Co-Attention Networks for Visual Question Answering", arXiv: 1906.10770v1 [cs.CV] Jun. 25, 2019, 11 Pages.

Gavrilyuk K., et al., "Actor and Action Video Segmentation from a Sentence", Computer Vision and Pattern Recognition, arxiv.org, Cornell University Library, 201 OLIN Library Cornell University Ithaca, NY 14853, Mar. 20, 2018 (Mar. 20, 2018), pp. 1-14.

International Search Report and Written Opinion—PCT/US2021/059485—ISA/EPO—Feb. 23, 2022.

Li Z., et al., "Tracking by Natural Language Specification," IEEE Conference on Computer Vision and Pattern Recognition, 2017, pp. 6495-6503, XP033250103, ISSN: 1063-6919, DOI: 10.11 09/CVPR. 2017.777, (pp. 6495-6503), [retrieved on Nov. 6, 2017].

Feng Q., et al., "Real-time Visual Object Tracking with Natural Language Description", 2020 IEEE Winter Conference on Applications of Computer Vision (WACV), IEEE, Mar. 1, 2020 (Mar. 1, 2020), pp. 689-698, DOI: 10.1109/WACV45572.2020.9093425.

Feng Q., et al., "Tell Me What to Track", arxiv.org, Cornell University Library, 201 OLIN Library Cornell University Ithaca, NY 14853, Jul. 26, 2019 (Jul. 26, 2019), XP081456176, 12 Pages.

Wang X., et al., "Describe and Attend to Track: Learning Natural Language Guided Structural Representation and Visual Attention for Object Tracking", arxiv.org, Cornell University Library, 201 OLIN Library Cornell University Ithaca, NY 14853, Nov. 2018.

* cited by examiner

LINGUALLY CONSTRAINED TRACKING OF VISUAL OBJECTS

CROSS-REFERENCE TO RELATED APPLICATION

The present application claims the benefit of U.S. Provisional Patent Application No. 63/114,356, filed on Nov. 16, 2020, and titled "LINGUALLY CONSTRAINED TRACKING OF VISUAL OBJECTS," the disclosure of which is expressly incorporated by reference in its entirety.

FIELD OF INVENTION

Aspects of the present disclosure generally relate to tracking of objects in a video.

BACKGROUND

Artificial neural networks may comprise interconnected groups of artificial neurons (e.g., neuron models). The artificial neural network may be a computational device or may be represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks also have numerous applications in image-based processing of videos or video streams such as object detection and tracking. Visual object tracking is the task of following a target object throughout a given video. Visual object tracking has many practical applications, including video surveillance and target-specific video summarization, where a target is monitored with respect to certain predefined constraints. Conventional tracking systems may provide motion trajectory information for an object. However, because there is an absensce of semantic information, tracking with visual object constraints is challenging.

SUMMARY

In an aspect of the present disclosure, a computer-implemented method for tracking visual objects is provided. The computer-implemented method includes receiving a lingual constraint and a video. The computer-implemented method also includes generating a word embedding based on the lingual constraint. Additionally, the computer-implemented method includes extracting a set of features for one or more frames of the video. The computer-implemented method also includes cross-correlating the word embedding and the set of features for the one or more frames of the video. Further, the computer-implemented method includes generating a prediction based on the cross-correlation.

In other aspects of the present disclosure, an apparatus for tracking visual objects is provided. The apparatus includes a memory and one or more processors coupled to the memory. The processor(s) are configured to receive a lingual constraint and a video. The processor(s) are also configured to generate a word embedding based on the lingual constraint. In addition, the processor(s) are configured to extract a set of features for one or more frames of the video. The processor(s) are also configured to cross-correlate the word embedding and the set of features for the one or more frames of the video. Further, the processor(s) are configured to generate a prediction based on the cross-correlation.

In other aspects of the present disclosure, an apparatus for tracking visual objects is provided. The apparatus includes means for receiving a lingual constraint and a video. The apparatus also includes means for generating a word embedding based on the lingual constraint. Additionally, the apparatus includes means for extracting a set of features for one or more frames of the video. The apparatus also includes means for cross-correlating the word embedding and the set of features for the one or more frames of the video. Further, the apparatus includes means for generating a prediction based on the cross-correlation.

In further aspects of the present disclosure, a non-transitory computer readable medium is provided. The computer readable medium has encoded thereon program code for tracking visual objects. The program code is executed by a processor and includes code to receive a lingual constraint and a video. The program code also includes code to generate a word embedding based on the lingual constraint. Additionally, the program code includes code to extract a set of features for one or more frames of the video. The program code also includes code to cross-correlate the word embedding and the set of features for the one or more frames of the video. Furthermore, the program code includes code to generate a prediction based on the cross-correlation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
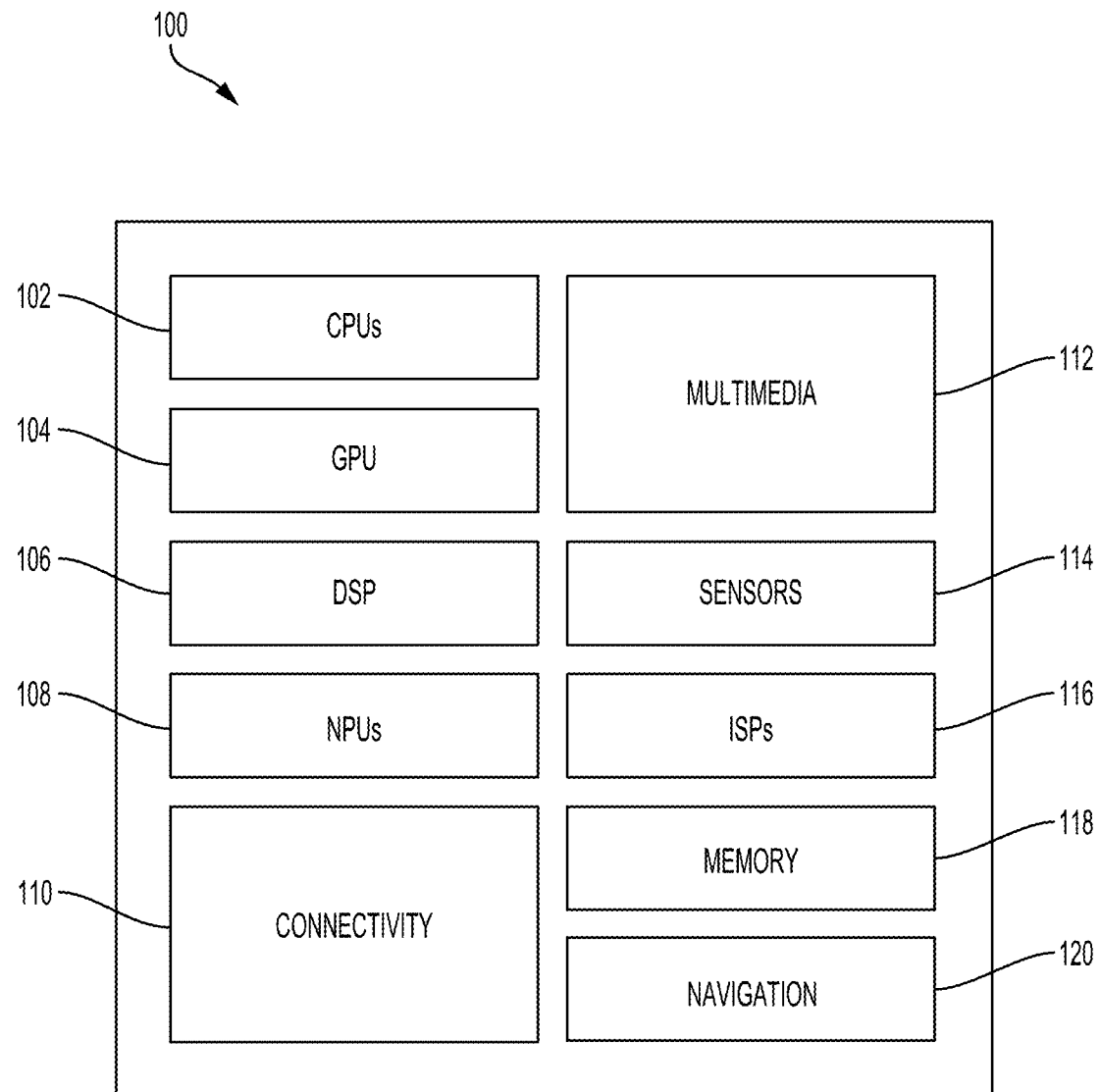
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks have numerous applications in image-based processing of videos or video streams such as object detection and tracking. Visual object tracking is the task of following a target object throughout a given video. Visual object tracking has many practical applications, including video surveillance and target-specific video summarization, where a target is monitored with respect to certain pre-defined constraints. Conventional tracking systems may provide motion trajectory information for an object. However, because there is an absence of semantic information, tracking with visual object constraints is challenging.

Accordingly, aspects of the present disclosure are directed to lingual constraints in the form of sentences in the tracking domain. The lingual constraints are incorporated within tracking. That is, additional constraints such as a natural language sentence may be imposed on the tracking process, rather than only performing similarity learning to match a target to the ground-truth frame. Unlike conventional tracking techniques, the present disclosure relieves the burden of a user having to review or watch all the images of a potentially very long track (e.g., the sequence of frames the target was tracked) to locate the target. The lingual constraint is a lingual specification that the set of frames are matched to, such that the tracking sequence may be filtered to these frames. For example, a lingual constraint such as the phrase "next to a yellow car" may be applied to a person to determine frames in a video (e.g., a video stream) in which a person is near a yellow car.

To determine whether or not the lingual constraint is satisfied, the described constraint (e.g., object) may have to be proximate or 'close to' the target object that is being tracked. In some aspects, the constraint may be satisfied when the target object and the constraint object are in close proximity. For example, if the lingual object constraint is a pencil, and the tracking target is a person, the constraint may be satisfied if the person is holding the pencil or otherwise near the pencil. To track (or find) the target when the constraint is satisfied, the target is located in those frames. In some aspects, the tracker may continuously track the target, even while the constraint is unsatisfied. If the constraint is satisfied, the user may also gain this information for these video frames.

FIG. 1 illustrates an example implementation of a system-on-a-chip (SoC) 100, which may include a central processing unit (CPU) 102 or a multi-core CPU configured for visual object tracking with lingual constraints. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to receive a lingual constraint and a video. The general-purpose processor 102 may also include code to generate a word embedding based on the lingual constraint. The general-purpose processor 102 may further include code to extract a set of features for one or more frames of the video. The general-purpose processor 102 may also include code to cross-correlate the word embedding and the set of features for the one or more frames of the video. The general-purpose processor 102 may include code to generate a prediction based on the cross-correlation.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
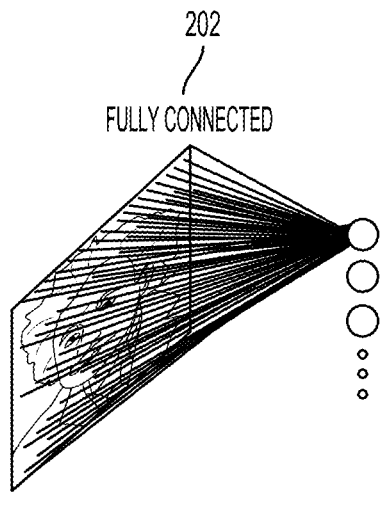
FIGS. 2A, 2B, and 2C are diagrams illustrating a neural network, in accordance with aspects of the present disclosure.
Figure 2B:
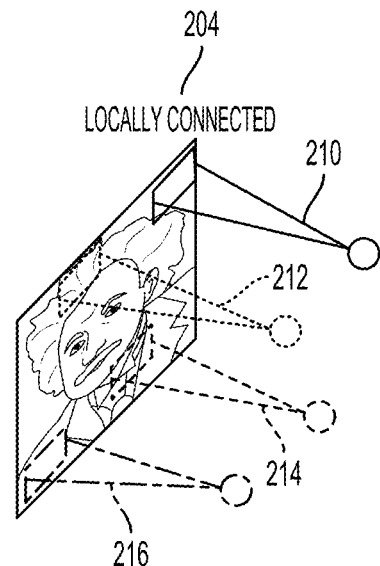

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
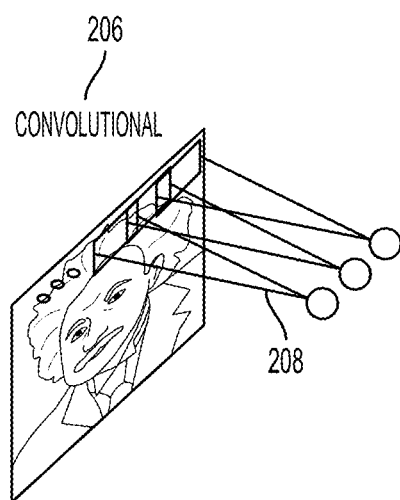

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
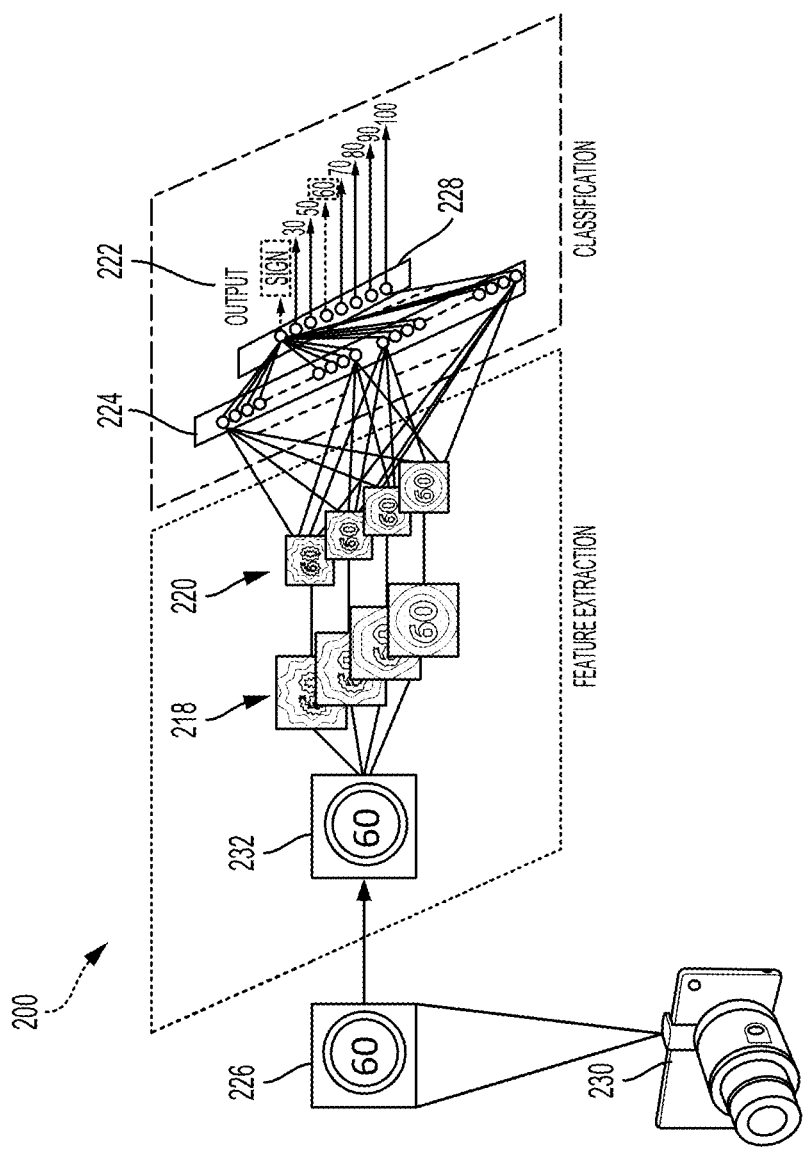
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
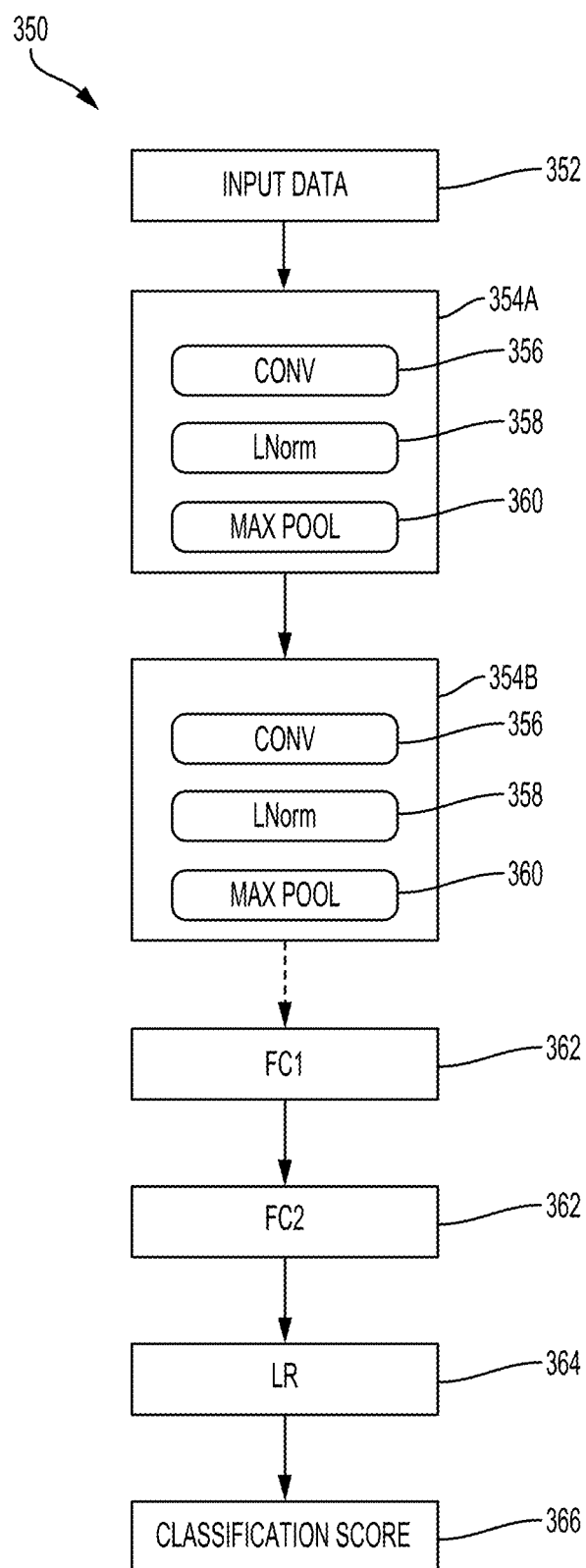
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
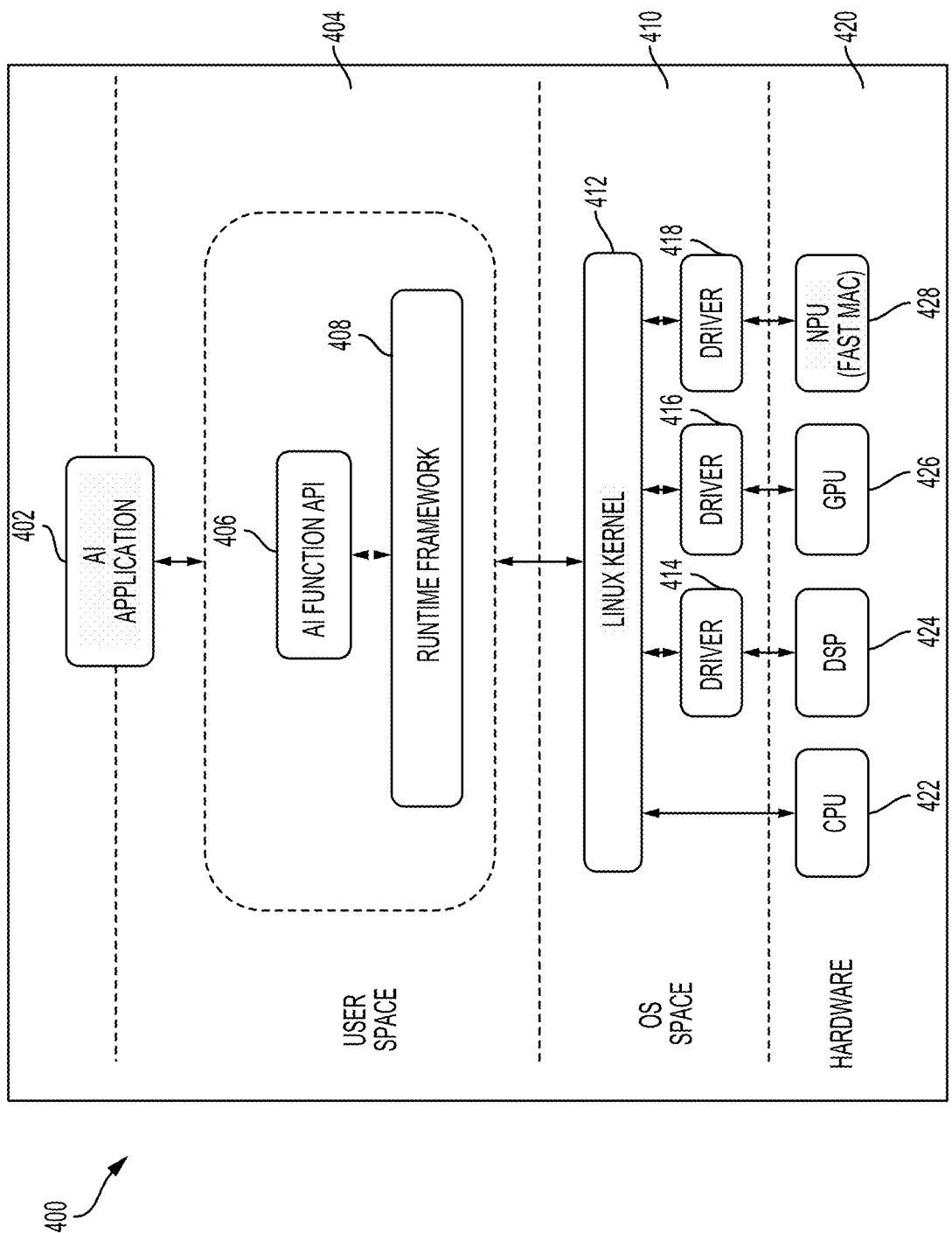
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of a system-on-a-chip (SoC) 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space, such as a Linux Kernel 412, running on the SoC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SoC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Aspects of the present disclosure are directed to tracking an object in a video using lingual constraints. A lingual constraint is a sentence or phrase that describes a certain state or environment of a target object. Lingual constraints may be provided by a user, for example, and may be in the form of a natural language sentence. A natural language sentence is a human language (e.g., English, Spanish, or French, rather than a computer programming language) as spoken or written, which may include contextual nuances. In some aspects, the lingual constraint is not a predefined entity and may be unrestricted in content. That is, the lingual constraint is not bound to any set of words or classes.

In accordance with aspects of the present disclosure, lingual constraints are incorporated into a tracking model architecture. To integrate the prediction of the constraint into the architecture, a natural language query is first processed with a word embedding model. The word embedding model may generate word embeddings, which provide a robust feature map for the lingual constraints, to reduce, or in some aspects avoid, training a language model for this purpose. In some aspects, each of the word embeddings may have 300 dimensions. The input sequence may be padded with zeros to a fixed length L, the maximum sentence length, for consistent representation for each of the word embeddings. For example, given a fixed maximum sentence size of L=20, the word embeddings produce a feature map $S \in \mathbb{R}^{20 \times 300}$ where the input sentence is denoted as the word sequence $(w_1, \ldots, w_k)$. Given the lingual constraint processed into an embedding $S \in \mathbb{R}^{20 \times 300}$ and a search image processed into a feature map by the backbone network $\varphi$, $X=\varphi(x) \in \mathbb{R}^{(3 \times 256) \times 31 \times 31}$, the constraint may be predicted from the features of the feature map.

Figure 5:
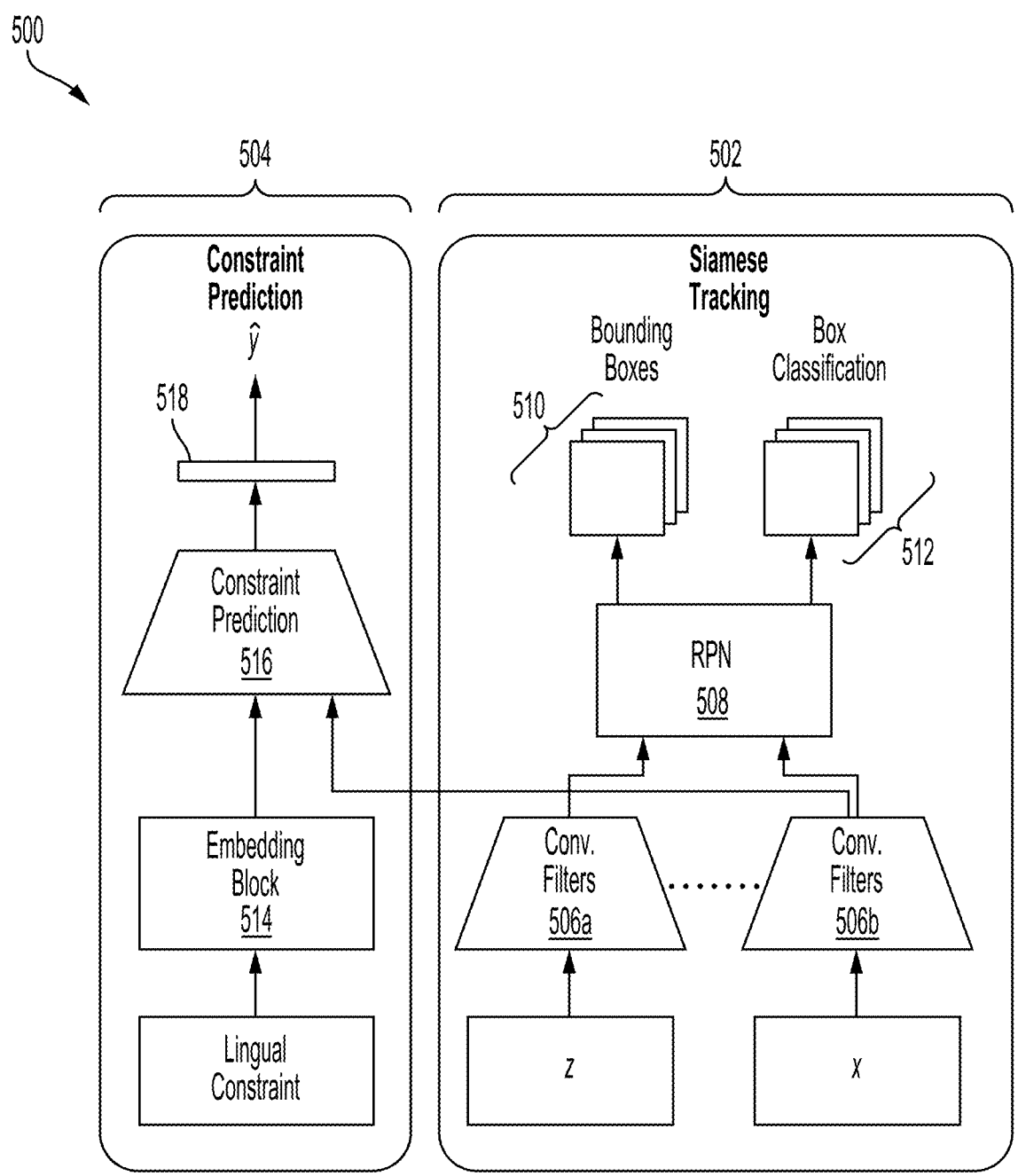
FIG. 5 is a high-level block diagram illustrating an example architecture for lingually constrained tracking of visual objects, in accordance with aspects of the present disclosure.

FIG. 5 is a high-level block diagram illustrating an example architecture 500 for lingually constrained tracking of visual objects, in accordance with aspects of the present disclosure. Referring to FIG. 5, the architecture 500 includes a tracking component 502 and a constraint prediction component 504. In the example of FIG. 5, the tracking component 502 is shown as a Siamese neural network. However, the present disclosure is not so limiting and other systems and network architectures may be used for object tracking. A Siamese neural network is a class of artificial neural network that includes two or more subnetworks that have the same parameters and weights. The subnetworks work in tandem on two different input vectors (e.g., an image of a person taken at two different angles or images of two signatures) and the outputs of each are compared to determine whether there is a match.

The example architecture 500 may receive as inputs, a lingual constraint (may also be referred to as a "sentence constraint") and a video to be searched. The video may, for example, be a video stream or sequence of frames. Each frame in the sequence of frames may include an image that may be referred to as search image x. The lingual constraint, may for example, be a natural language sentence or phrase for which the video is to be searched. For example, the lingual constraint may be "a boy with a backpack," "a bird on a yellow car," or "a girl on a bicycle." Thus, one task for the example architecture 500 is to search the video (e.g., search image $x_t$ of a frame at time t) to find frames that include images corresponding to the lingual constraint.

One challenge for the constraint prediction is the integration of the information in the lingual constraint features S and the search image features X. In other words, this challenge relates to detection and classification of the lingual constraint in the search image. The tracking component 502 receives as input, the $x_t$ of the target at time-step t (e.g., image of a frame of the video at time t), using the ground truth reference image $z^{t=0}$ to determine whether the $x_t$ includes the reference image z. The search image $x_t$ and the reference image z are respectively processed via successive layers of convolutional filters 506a and 506b, which have the same parameters. The convolutional filters 506a generate a feature map Z corresponding to the reference image z and the convolutional filters 506b generate a feature map X corresponding to the search image $x_t$. The feature maps Z and X output via the convolutional filters 506a and 506b, respectively, are supplied to a region proposal network (RPN) 508. The RPN 508 processes the feature maps Z and X to generate a set of bounding box proposals 510 of different sizes based on the feature maps and a corresponding set of classifications 512. The set of classifications 512 may indicate whether the corresponding bounding box proposals 510 includes a match of the search image $x_t$ and the reference image z. In other words, the set of classifications 512 may indicate whether an object shown in reference image z is detected in the search image $x_t$ (e.g., a frame of the video).

On the other hand, the constraint prediction component 504 may receive the lingual constraint as an input. The lingual constraint may be supplied to an embedding block 514. The embedding block 514 processes the lingual constraint to generate a word embedding. The embedding block 514 may include a neural network that learns word associations from a corpus of text. The embedding block may represent each distinct word with a list of vectors. Using a cosine similarity, for example, a semantic similarity between words may be indicated. The word embedding may, for example, be a feature map S. The word embedding is supplied to a constraint prediction block 516 along with the feature map output of convolutional filters 506b corresponding to the search image $x_t$. In turn, the constraint prediction block 516 may generate a constraint prediction $\hat{y}$ via an activation layer 518. The constraint prediction $\hat{y}$ indicates whether the search image $x_t$ matches the lingual constraint.

In some aspects, the constraint prediction $\hat{y}_i$ may be optimized using a binary cross-entropy loss:

$$L_i(\hat{y}_i, y_i) = -(y_i \log(\hat{y}_i) + (1-y_i)\log(1-\hat{y}_i)). \quad (1)$$

Figure 6:
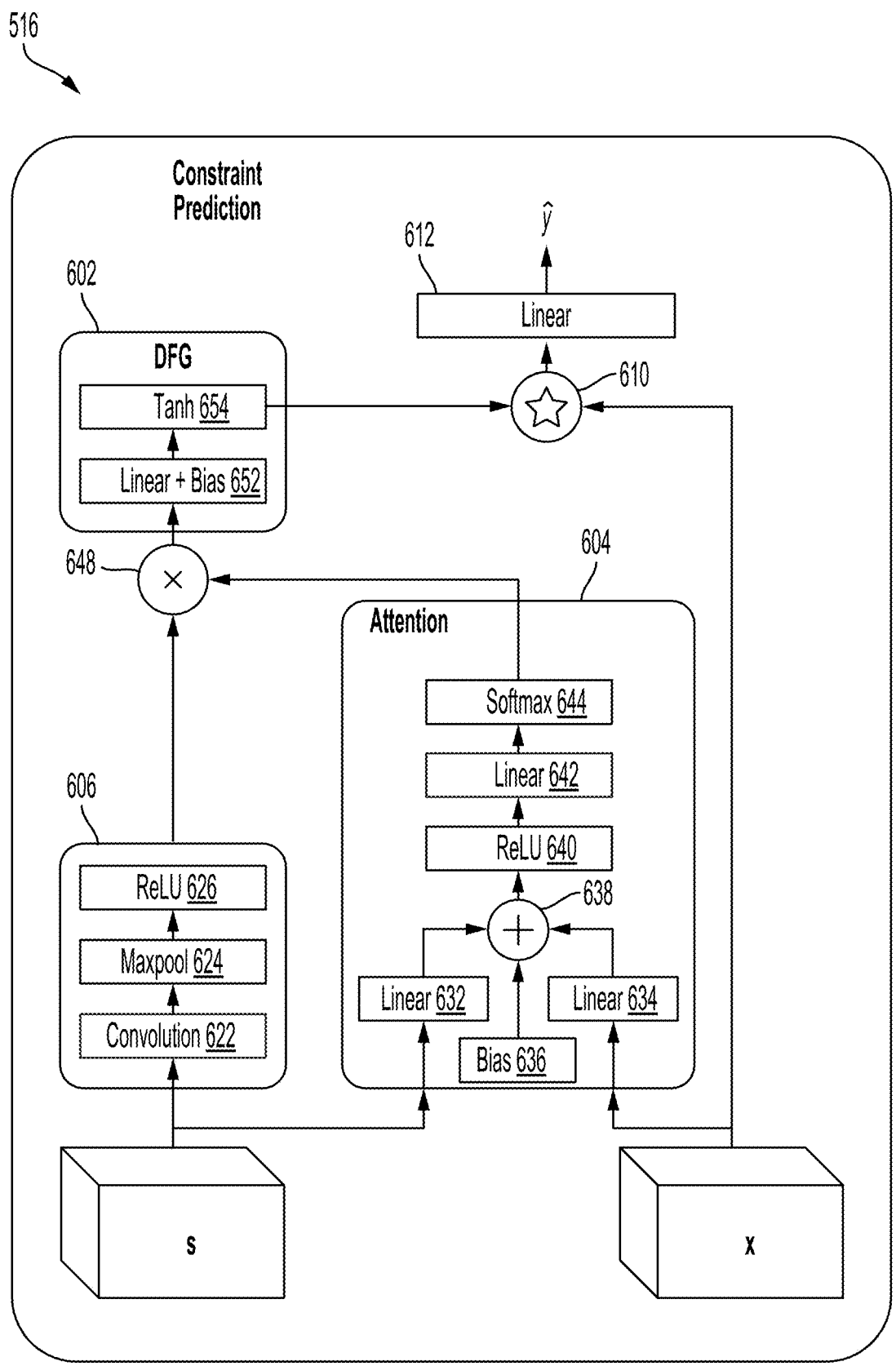
FIG. 6 is a diagram illustrating an example constraint prediction block for tracking with lingual constraints, in accordance with aspects of the present disclosure.

FIG. 6 is a diagram illustrating an example constraint prediction block 516 for tracking with lingual constraints, in accordance with aspects of the present disclosure. As shown in FIG. 6, the constraint prediction block 516 may include a dynamic filter generation (DFG) block 602 and an attention block 604. The DFG block 602 generates word embeddings attended by or included in the search frame x. Having generated the word embeddings, the DFG block 602 may generate dynamic convolutional filters from the lingual constraint (e.g., sentence). The dynamic convolutional filters may enable the generation of filters specific to the more important words in the lingual constraint, thus producing activation specific to the more important words present in the lingual constraint. In turn, the constraint prediction block 516 produces a cross-correlation between the dynamic filters f and features of the search frame x to generate the constraint prediction $\hat{y}_i$.

Rather than using a long short term memory (LSTM) for processing in conventional approaches, the word embedding may be processed via a network that is fully convolutional (e.g., deep convolutional network 350). For example, as shown in FIG. 6, the word embedding may be fed through a convolutional neural network (CNN) 606. The CNN 606 may receive the word embedding (e.g., feature map S) as an input. The CNN 606 may include a one-dimensional convolution layer 622 to process the word embedding. In some aspects, padding (e.g., adding zeros) may be implemented to maintain the dimensions of the word embedding. The features are max pooled via the max pool layer 624. A rectifier linear unit (ReLU) activation function is applied via ReLU 626 to generate a feature matrix H. In one example, a word embedding $S \in \mathbb{R}^{20 \times 300}$ may be transformed to a feature matrix $H=CNN(S) \in \mathbb{R}^{10 \times 150}$, for example.

The attention block 604 integrates information from the search frame (search image $x_t$) into the word embedding S. In some aspects, the attention block 604 may be implemented as a multilayer perceptron (MLP). A MLP is a feedforward network that uses a mathematical function to map a set of inputs to a set of outputs. The attention block 604 generates attention weights for words in the lingual constraint that are likely (e.g., having the greatest probability) to be the most important. The attention block 604 generates the attention weights based on the search frame and each of the word embeddings themselves. One purpose for doing so is to attend or place emphasis on the constraint based on the words in the constraint that are also visible in the search frame. That is, the attention block 604 draws the focus to the more important words in the sentence (e.g., the constraint), which are represented by a word embedding. To do so, the attention block 604 may incorporate the search frame (search image $x_t$) and the sentence (e.g., constraint) itself, where any matches between the words in the sentence (constraint) and the search frame should get attention by the attention block 604.

The attention block 604 receives each word embedding and features of the search frame x as inputs. The word embedding S and the features of the search frame are respectively processed via linear layers 632 and 634. Linear layers are layers that may learn a constant such as an average rate of correlation between an output and an input. In the example of the FIG. 6, linear layers (e.g., 612, 632, 634, 642) may modify the feature dimensions of its input feature. The bias 636 may represent a vector initialized to all zeros that may be tuned by the backpropagation mechanism. The bias 636 may be added such that the output may be offset by a scalar value. Accordingly, the word embedding S and the features of the search frame X may be linearized via linear layers 632, 634 and combined via summing node 638. The output of summing node 638 is supplied to ReLU 640 to produce the set of attention weights which based on the word embedding S and the features of the search frame X. The dimensions of the attention weights may be modified via the linear layer 642. The attention weights may be normalized via softmax layer 644 and output to multiplier node 648. A matrix multiplication operation is performed multiplying the feature matrix H by the attention weights to produce the feature vector h, where the resulting feature vector represents interpolated words as $h_t \in \mathbb{R}^{1 \times 150}$ for instance.

The DFG block 602 receives a feature vector $h_t$ representing each word embedding and generates dynamic (convolution) filters f from the sentence. The dynamic convolution filters enable the model to create filters specific to the provided lingual constraint. The DFG block 602 thus generates activations specific to the attended (e.g., emphasized or more important) words in the constraint. In some aspects, the DFG block 602 may include a linear layer and bias 652 with a tanh activation function 654 that produces the convolutional filters:

$$f = \tanh(W_f \tilde{v} + b_f), \quad (2)$$

where, for example, $f \in \mathbb{R}^{768 \times 1 \times 1}$, $b_f$ is a bias term and $W_f$ is the attention weights and $\tilde{v}$ is the feature vector representing the word embedding.

After computing the dynamic filters f, the dynamic filters f are convolved with the visual features of the search frame x, using a depth-wise cross-correlation layer 610. The depth-wise cross-correlation layer 610 reduces the number of parameters compared to a normal cross-correlation. The depth-wise cross-correlation layer 610 produces an activation map, A=X*f, where * denotes a depth-wise cross correlation, convolving the search features and the dynamic filters. In some aspects, the activation map A may be supplied to a linear layer 612, which flattens the activation map A to a single probability and project a scalar prediction ŷ.

Figure 7:
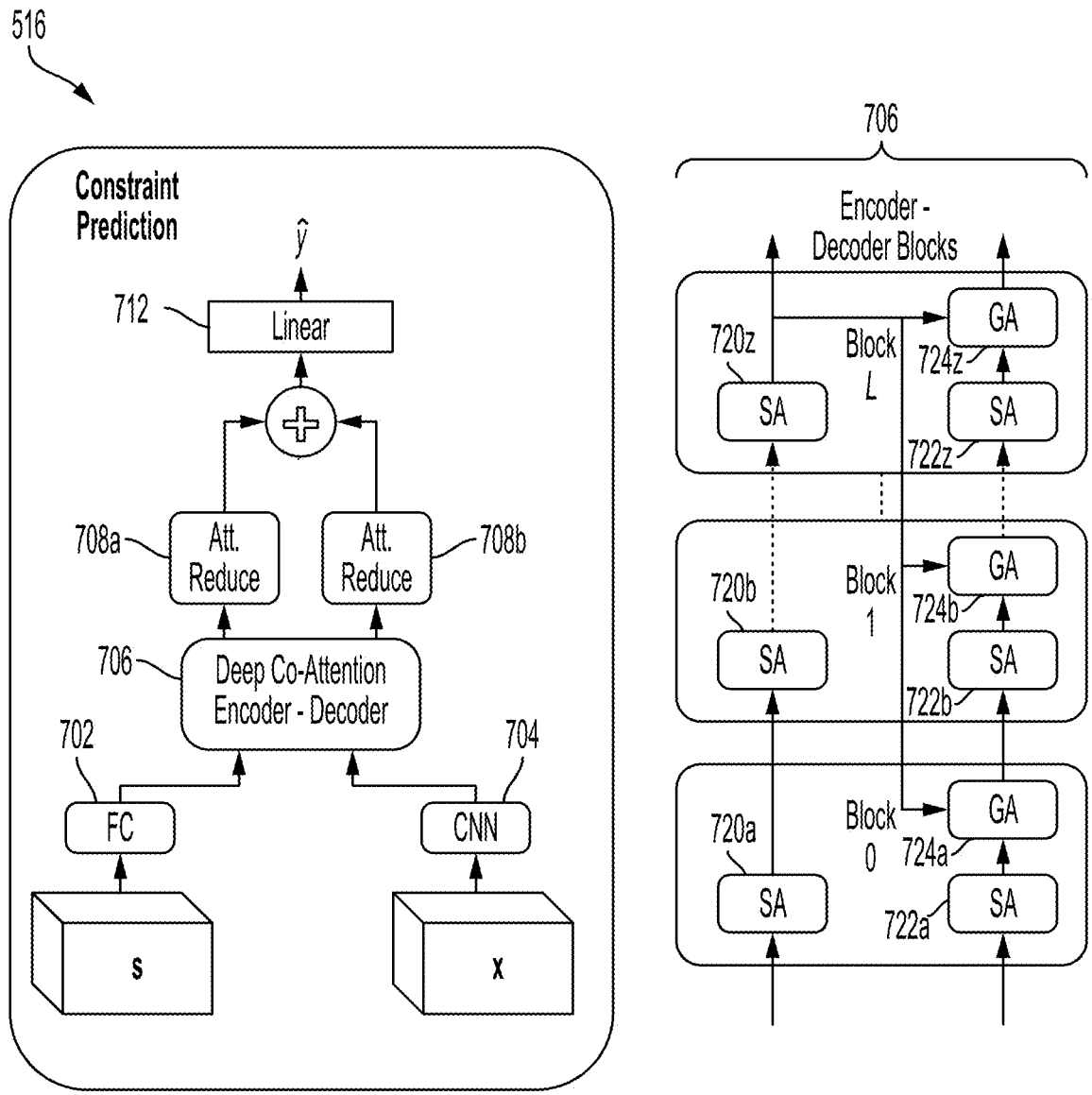
FIG. 7 is a diagram illustrating an example constraint prediction block for tracking with lingual constraints, in accordance with aspects of the present disclosure.

FIG. 7 is a diagram illustrating another example constraint prediction block 516 shown in FIG. 5 for tracking with lingual constraints, in accordance with aspects of the present disclosure. As shown in FIG. 7, the constraint prediction block 516 is similar to the example shown in FIG. 6, but includes self-attention networks that operate as a deep co-attention encoder-decoder 706. Features (e.g., each word embedding) $S \in \mathbb{R}^{20 \times 300}$ of the lingual constraint are received along with the feature map of the search image $X \in \mathbb{R}^{(3 \times 256) \times 31 \times 31}$. Although particular dimensions of the features and other aspects are provided, such dimensions are merely an example, provided for ease of understanding. As shown in the example of FIG. 7, the constraint prediction block 516 may include a fully connected layer (FC) 702 and a convolutional neural network (CNN) 704 in addition to the deep co-attention encoder-decoder 706 (may be referred to as co-attention network 706). The features (e.g., each word embedding) S of the lingual constraint and the feature map search image features X are processed such that the dimensions are matched. The features (e.g., word embedding) S of the lingual constraint are supplied to the FC layer 702. In some examples, the FC layer 702 may be a linear layer such as a fully connected rectified linear unit (ReLU)). The FC layer 702 includes a set of input nodes (not shown) connected in an all-to-all fashion to expand the features (e.g., each word embedding) S of the lingual constraint to a feature dimension d, which corresponds to the channel dimension of the image features X.

A CNN 704 receives the image features X. In some aspects, the CNN 704 may be configured similar to CNN 606 shown in FIG. 6. The CNN 704 may process the image features X to reshape the image feature data to produce reshaped image features $X_r \in \mathbb{R}^{(256 \times 3) \times 75}$ for instance. In some aspects, the width and height dimension of the image may be concatenated. Additionally, in some aspects, the number of image features X may be further reduced. For instance, the locations of the image features X may be reduced. In doing so, the computational complexity and size of the constraint prediction block 516 may be reduced. Accordingly, the features (e.g., each word embedding) S of the lingual constraint and image features X may be reshaped and matched.

The reshaped image features $X_r$, and the features (e.g., each word embedding) S of the lingual constraint, are supplied to the co-attention network 706. The co-attention network 706 encodes the features (e.g., each word embedding) S of the lingual constraint and self-attends to image features X. Then, the self-attention network 706 correlates or co-attends the image features X based upon the features (e.g., each word embedding) S of the lingual constraint. Each self-attention (SA) block 720a-720z takes in the word embedding and attends or 'puts emphasis' on words of the embeddings that are the most important. For example, the SA blocks (e.g., 720a-720z) may attend characteristic words such as colors or objects, while 'de-attending' or de-emphasizing articles that have less semantic meaning.

The SA-gated attention (GA) pairs (e.g. 722a, 724a) in each block first self-attend the search image features X in a similar fashion, but now visually. After each SA block (e.g., 722a-722z), the GA block (e.g., 724a-724z) attends the image features X based on the encoded word embedding from the output of the SA block 720z of block L. Accordingly, the deep co-attention encoder-decoder 706 may attend the visual objects that are also present in the word embedding S. The outputs of the encoder-decoder blocks are of the same shape and are the attended (encoded) word embedding and the attended visual features.

The image features and features representing the lingual constraint are fused to one representation via attention reduction blocks 708a,708b and classified. The attentional reduction blocks 708a, 708b may reduce the number of highly dimensional features from the fused representation and may reduce a loss of important information. After the attentional reduction 708,708b, the features are added together and projected to a single scalar (e.g., the constraint prediction $\hat{y}_i$) using a linear layer 712. Once the constraint prediction $\hat{y}_i$ is obtained, the constraint prediction block 516 may be optimized with the binary cross-entropy loss.

In some aspects, the constraint prediction block 516 may further include a pyramid pooling module (PPM) (not shown) to further improve the localization of the lingual constraint. The PPM may add global features at every location in the image, computed at different scales s. The global features provide additional channels, which may function as a prior for the image. Given the feature map for the image X, adaptive average pooling may be applied to reduce the feature maps to a scale of s×s, where s∈{1,2,3,6}, after which these features may be supplied to a convolution layer, and then concatenated onto the output features. In one example, a PPM layer may be included between the search image features X and the CNN 704 to further improve the feature embedding of the search image features X.

Figure 8:
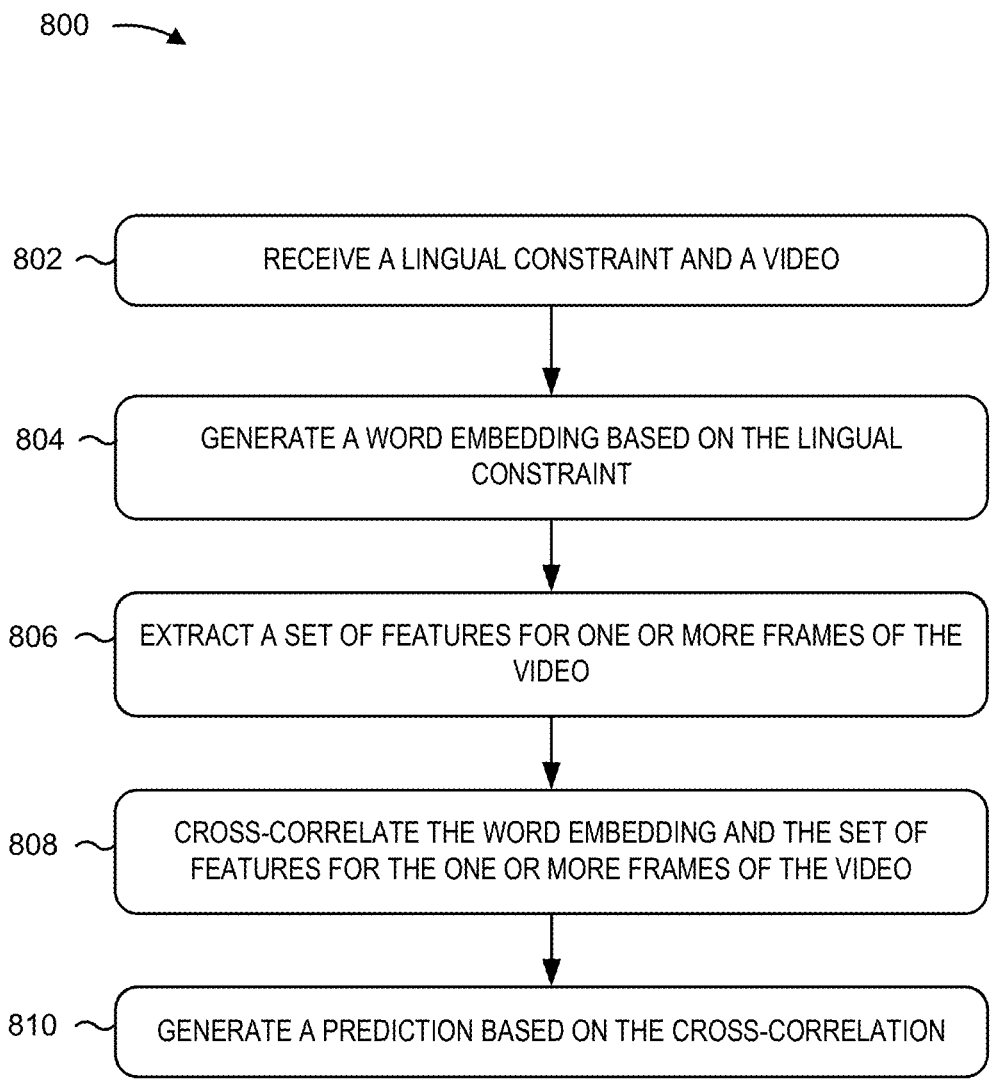
FIG. 8 is a flow diagram illustrating a computer-implemented method for tracking a visual object with lingual constraints, in accordance with aspects of the present disclosure.

FIG. 8 is a flow diagram illustrating a computer-implemented method 800 for tracking a visual object with lingual constraints via an artificial neural network, in accordance with aspects of the present disclosure. As shown in FIG. 8, at block 802, a lingual constraint and a video are received. As described with reference to FIG. 5, The example architecture 500 may receive as inputs, a lingual constraint (may also be referred to as a "sentence constraint") and a video to be searched. The video may, for example, be a video stream or sequence of images and is referred to as search image $x_t$. The lingual constraint, may for example, be a natural language sentence or phrase for which the video is to be searched. For example, the lingual constraint may be "a boy with a backpack," "a bird on a yellow car," or "a girl on a bicycle."

At block 804, a word embedding is generated based on the lingual constraint. For instance, as described with reference to FIG. 5, the lingual constraint may be supplied to an embedding block 514. The embedding block 514 processes the lingual constraint to generate a word embedding. The word embedding may, for example, be a feature map S.

At block 806, a set of features is extracted for one or more frames of the video. As described with reference to FIG. 5, the tracking component 502 receives as input, the search image $x_t$ of the target at time-step t (e.g., frame t of the video), using the ground truth reference image $z^{t=0}$ to determine whether the search image $x^t$ includes the reference image z. The search image $x^t$ and the reference image z are respectively processed via successive layers of convolutional filters 506a and 506b, which have the same parameters. The convolutional filters 506a generate a feature map Z corresponding to the reference image z and the convolutional filters 506b generate a feature map X corresponding to the search image $x^t$.

At block 808, the word embedding and the set of features for the one or more frames of the video are cross-correlated. For example, as described with reference to FIG. 5, The word embedding is supplied to a constraint prediction block 516 along with the feature map output of convolutional filters 506b corresponding to the search image $x^t$.

At block 810, a prediction is generated based on the cross-correlation. For instance, as described with reference to FIG. 5, the constraint prediction block 516 may generate a constraint prediction ŷ via an activation layer 518. The constraint prediction ŷ indicates whether the search image $x_t$ matches the lingual constraint.

Implementation examples are provided in the following numbered clauses:

1. A computer-implemented method, comprising:
   receiving a lingual constraint and a video;
   generating a word embedding based on the lingual constraint;
   extracting a set of features for one or more frames of the video;
   cross-correlating the word embedding and the set of features for the one or more frames of the video; and
   generating a prediction based on the cross-correlation.

2. The computer-implemented method of clause 1, in which one or more words of the lingual constraint are represented as vectors, the word embedding being determined based on a semantic similarity between the vectors.

3. The computer-implemented method of clause 1 or 2, in which the prediction provides an indication of whether the word embedding matches the one or more frames of the video.

4. The computer-implemented method of any of clauses 1-3, in which information from the one or more frames is integrated into the word embedding.

5. The computer-implemented method of any of clauses 1-4, in which the word embedding is attended based on words in the lingual constraint that are visible in the one or more frames of the video.

6. The computer-implemented method of any of clauses 1-5, in which the cross-correlation comprises a depth-wise cross-correlation.

7. The computer-implemented method of any of clauses 1-6, in which a set of convolutional filters extract the set of features.

8. The computer-implemented method of any of clauses 1-8, further comprising generating dynamic filters to produce activations specific to attended words in the lingual constraint.

9. The computer-implemented method of clause 1, in which the prediction provides an indication of whether the lingual constraint and the set of features for the one or more frames of the video are matched.

10. An apparatus, comprising:
    a memory; and
    at least one processor coupled to the memory, the at least one processor being configured:
      to receive a lingual constraint and a video;
      to generate a word embedding based on the lingual constraint;
      to extract a set of features for one or more frames of the video;
      to cross-correlate the word embedding and the set of features for the one or more frames of the video; and
      to generate a prediction based on the cross-correlation.

11. The apparatus of clause 10, in which the at least one processor is further configured to represent one or more words of the lingual constraint as vectors, the word embedding being determined based on a semantic similarity between the vectors.

12. The apparatus of clause 10 or 11, in which the prediction provides an indication of whether the word embedding matches the one or more frames of the video.

13. The apparatus of any of clauses 10-12, in which the at least one processor is further configured to integrate information from the one or more frames into the word embedding.

14. The apparatus of any of clauses 10-13, in which the word embedding is attended based on words in the lingual constraint that are visible in the one or more frames of the video.

15. The apparatus of any of clauses 10-14, in which the at least one processor is further configured to perform a depth-wise cross-correlation on the word embedding and the set of features for the one or more frames of the video.

16. The apparatus of any of clauses 10-15, in which the at least one processor is further configured to extract the set of features via a set of convolutional filters.

17. The apparatus of any of clauses 10-16, in which the at least one processor is further configured to generate dynamic filters to produce activations specific to attended words in the lingual constraint.

18. The apparatus of any of clauses 10-17, in which the prediction provides an indication of whether the lingual constraint and the set of features for the one or more frames of the video are matched.

19. An apparatus, comprising:
means for receiving a lingual constraint and a video;
means for generating a word embedding based on the lingual constraint;
means for extracting a set of features for one or more frames of the video;
means for cross-correlating the word embedding and the set of features for the one or more frames of the video; and
means for generating a prediction based on the cross-correlation.

20. The apparatus of clause 19, further comprising means for representing one or more words of the lingual constraint as vectors, the word embedding being determined based on a semantic similarity between the vectors.

21. The apparatus of clause 19 or 20, in which the prediction provides an indication of whether the word embedding matches the one or more frames of the video.

22. The apparatus of any of clauses 19-21, further comprising means for integrating information from the one or more frames into the word embedding.

23. The apparatus of any of clauses 19-22, in which the word embedding is attended based on words in the lingual constraint that are visible in the one or more frames of the video.

24. The apparatus of any of clauses 19-23, further comprising means for performing a depth-wise cross-correlation on the word embedding and the set of features for the one or more frames of the video.

25. A non-transitory computer readable medium having encoded thereon, program code, the program code being executed by a processor and comprising:
program code to receive a lingual constraint and a video;
program code to generate a word embedding based on the lingual constraint;
program code to extract a set of features for one or more frames of the video;
program code to cross-correlate the word embedding and the set of features for the one or more frames of the video; and
program code to generate a prediction based on the cross-correlation.

26. The non-transitory computer readable medium of clause 25, further comprising program code to represent one or more words of the lingual constraint as vectors, the word embedding being determined based on a semantic similarity between the vectors.

27. The non-transitory computer readable medium of clause 25 or 26, in which the prediction provides an indication of whether the word embedding matches the one or more frames of the video.

28. The non-transitory computer readable medium of any of clauses 25-27, further comprising program code to integrate information from the one or more frames into the word embedding.

29. The non-transitory computer readable medium of any of clauses 25-28, in which the word embedding is attended based on words in the lingual constraint that are visible in the one or more frames of the video.

30. The non-transitory computer readable medium of any of clauses 25-29, further comprising program code to perform a depth-wise cross-correlation on the word embedding and the set of features for the one or more frames of the video.

In one aspect, the receiving means, the receiving means, generating means, extracting means, cross-correlating means, and/or the predicting means may be the CPU 102, program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method, comprising:
receiving a lingual constraint and a video;
generating a word embedding based on the lingual constraint;
extracting a set of visual features from one or more frames of the video;
generating a set of attention weights based on the word embedding and visual features of the set of visual features from the one or more frames of the video;
generating one or more dynamic convolutional filters for the lingual constraint based on the set of attention weights;
convolving the one or more dynamic convolution filters and one or more visual features of the set of visual features for the one or more frames of the video to produce a cross-correlation; and
generating a prediction based on the cross-correlation.

2. The computer-implemented method of claim 1, in which one or more words of the lingual constraint are represented as vectors, the word embedding being determined based on a semantic similarity between the vectors.

3. The computer-implemented method of claim 1, in which the prediction provides an indication of whether the word embedding matches the one or more frames of the video.

4. The computer-implemented method of claim 1, in which information from the one or more frames is integrated into the word embedding.

5. The computer-implemented method of claim 1, in which the word embedding is attended based on words in the lingual constraint that are visible in the one or more frames of the video.

6. The computer-implemented method of claim 1, further comprising convolving the one or more dynamic convolution filters and the one or more visual features of the set of visual features for the one or more frames of the video using a depth-wise cross-correlation.

7. The computer-implemented method of claim 1, in which a set of convolutional filters extract the set of features.

8. The computer-implemented method of claim 1, in which the prediction provides an indication of whether the lingual constraint and the set of visual features for the one or more frames of the video are matched.

9. An apparatus, comprising:
at least one memory; and
at least one processor coupled to the at least one memory, the at least one processor being configured to:
receive a lingual constraint and a video;
generate a word embedding based on the lingual constraint;
extract a set of visual features from one or more frames of the video;
generate a set of attention weights based on the word embedding and visual features of the set of visual features from the one or more frames of the video;
generate one or more dynamic convolutional filters for the lingual constraint based on the set of attention weights;
convolve the one or more dynamic convolution filters and one or more visual features of the set of visual features for the one or more frames of the video to produce a cross-correlation; and
generate a prediction based on the cross-correlation.

10. The apparatus of claim 9, in which the at least one processor is further configured to represent one or more words of the lingual constraint as vectors, the word embedding being determined based on a semantic similarity between the vectors.

11. The apparatus of claim 9, in which the prediction provides an indication of whether the word embedding matches the one or more frames of the video.

12. The apparatus of claim 9, in which the at least one processor is further configured to integrate information from the one or more frames into the word embedding.

13. The apparatus of claim 9, in which the word embedding is attended based on words in the lingual constraint that are visible in the one or more frames of the video.

14. The apparatus of claim 9, in which the at least one processor is further configured to convolve, using a depth-wise cross-correlation, the word embedding and the one or more visual features of the set of visual features for the one or more frames of the video.

15. The apparatus of claim 9, in which the at least one processor is further configured to extract the set of features via a set of convolutional filters.

16. The apparatus of claim 9, in which the prediction provides an indication of whether the lingual constraint and the set of visual features for the one or more frames of the video are matched.

17. An apparatus, comprising:
means for receiving a lingual constraint and a video;
means for generating a word embedding based on the lingual constraint;
means for extracting a set of visual features from one or more frames of the video;
means for generating a set of attention weights based on the word embedding and visual features of the set of visual features from the one or more frames of the video;
means for generating one or more dynamic convolutional filters for the lingual constraint based on the set of attention weights;
means for convolving the one or more dynamic convolution filters and one or more visual features of the set of visual features for the one or more frames of the video to produce a cross-correlation; and
means for generating a prediction based on the cross-correlation.

18. The apparatus of claim 17, further comprising means for representing one or more words of the lingual constraint as vectors, the word embedding being determined based on a semantic similarity between the vectors.

19. The apparatus of claim 17, in which the prediction provides an indication of whether the word embedding matches the one or more frames of the video.

20. The apparatus of claim 17, further comprising means for integrating information from the one or more frames into the word embedding.

21. The apparatus of claim 17, in which the word embedding is attended based on words in the lingual constraint that are visible in the one or more frames of the video.

22. The apparatus of claim 17, further comprising means for convolving, using a depth-wise cross-correlation, the word embedding and the one or more visual features of the set of visual features for the one or more frames of the video.

23. A non-transitory computer readable medium having encoded thereon, program code, the program code being executed by a processor and comprising:
program code to receive a lingual constraint and a video;
program code to generate a word embedding based on the lingual constraint;
program code to extract a set of visual features from one or more frames of the video;
program code to generate a set of attention weights based on the word embedding and visual features of the set of visual features from the one or more frames of the video;
program code to generate one or more dynamic convolutional filters for the lingual constraint based on the set of attention weights;
program code to convolving the one or more dynamic convolution filters and one or more visual features of the set of visual features for the one or more frames of the video to produce a cross-correlation; and
program code to generate a prediction based on the cross-correlation.

24. The non-transitory computer readable medium of claim 23, further comprising program code to represent one or more words of the lingual constraint as vectors, the word embedding being determined based on a semantic similarity between the vectors.

25. The non-transitory computer readable medium of claim 23, in which the prediction provides an indication of whether the word embedding matches the one or more frames of the video.

26. The non-transitory computer readable medium of claim 23, further comprising program code to integrate information from the one or more frames into the word embedding.

27. The non-transitory computer readable medium of claim 23, in which the word embedding is attended based on words in the lingual constraint that are visible in the one or more frames of the video.

28. The non-transitory computer readable medium of claim 23, further comprising program code to convolve, using a depth-wise cross-correlation, the word embedding and the one or more visual features of the set of visual features for the one or more frames of the video.

* * * * *